(12) United States Patent
Yamazaki

(10) Patent No.: US 9,281,901 B2
(45) Date of Patent: Mar. 8, 2016

(54) PLANAR LIGHTWAVE CIRCUIT AND OPTICAL RECEIVER

(71) Applicant: Hiroyuki Yamazaki, Tokyo (JP)

(72) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 12 days.

(21) Appl. No.: 14/380,716

(22) PCT Filed: Feb. 18, 2013

(86) PCT No.: PCT/JP2013/000873
§ 371 (c)(1),
(2) Date: Aug. 23, 2014

(87) PCT Pub. No.: WO2013/132759
PCT Pub. Date: Sep. 12, 2013

(65) Prior Publication Data
US 2015/0078749 A1   Mar. 19, 2015

(30) Foreign Application Priority Data

Mar. 6, 2012   (JP) .................................. 2012-048681

(51) Int. Cl.
*H04J 14/00* (2006.01)
*H04B 10/60* (2013.01)
*H04B 10/61* (2013.01)
(Continued)

(52) U.S. Cl.
CPC ................ *H04B 10/60* (2013.01); *G02B 6/105* (2013.01); *G02B 6/12004* (2013.01); *G02B 6/4213* (2013.01); *H04B 10/25* (2013.01); *H04B 10/61* (2013.01); *H04J 14/06* (2013.01)

(58) Field of Classification Search
CPC ...... H04B 10/25; H04B 10/60; H04B 10/697; H04J 14/06
See application file for complete search history.

(56) References Cited

U.S. PATENT DOCUMENTS 7,460,793 B2 * 12/2008 Taylor .................... H04B 10/61
398/202
2003/0058504 A1 * 3/2003 Cho ....................... H04L 7/0075
398/147

(Continued)

FOREIGN PATENT DOCUMENTS

JP         3-33726 A      2/1991
JP         2011-76049 A   4/2011

(Continued)

OTHER PUBLICATIONS

International Search Report (ISR) (PCT Form PCT/ISA/210), in PCT/JP2013/000873, dated Mar. 19, 2013.

(Continued)

*Primary Examiner* — Dzung Tran
(74) *Attorney, Agent, or Firm* — McGinn IP Law Group, PLLC

(57) ABSTRACT

A planar lightwave circuit includes a substrate in which a groove being formed, the groove dividing the substrate into a first area and a second area; a first filter, a second filter, and a third filter intruded into the groove; as are formed in the first area, a first and a second waveguides formed to guide signal light and local oscillation light; a third and a fourth waveguides formed to guide signal light and local oscillation light; a first 90-degree optical hybrid; as are formed in the second area, a fifth and sixth waveguides formed to guide signal light and local oscillation light; and a second 90-degree optical hybrid.

20 Claims, 3 Drawing Sheets

(51) Int. Cl.
  *G02B 6/42* (2006.01)
  *G02B 6/10* (2006.01)
  *G02B 6/12* (2006.01)
  *H04B 10/25* (2013.01)
  *H04J 14/06* (2006.01)

(56) References Cited

U.S. PATENT DOCUMENTS

| | | | |
|---|---|---|---|
| 2010/0080560 A1* | 4/2010 | Mertz | H04B 10/67 398/76 |
| 2010/0178056 A1* | 7/2010 | Liu | H04B 10/61 398/65 |
| 2012/0008951 A1 | 1/2012 | Mikami | |
| 2012/0106984 A1* | 5/2012 | Jones | H04L 27/223 398/214 |
| 2012/0207474 A1 | 8/2012 | Inoue et al. | |
| 2012/0224184 A1* | 9/2012 | Li | H04B 10/60 356/491 |
| 2013/0177027 A1* | 7/2013 | Rasras | H04J 14/002 370/464 |

FOREIGN PATENT DOCUMENTS

| | | |
|---|---|---|
| JP | 2011-197433 A | 10/2011 |
| JP | 2012-4982 A | 1/2012 |
| JP | 2012-18225 A | 1/2012 |
| WO | WO 2011/027895 A1 | 3/2011 |

OTHER PUBLICATIONS

Beling A. et al., Fully-Integrated Polarization-Diversity Coherent Receiver Module for 100G DP-QPSK, Optical Fiber Communication Conference and Exposition (OFC/NFOEC) 2011 and the National Fiber Optic Engineers Conference, Mar. 2011, OML5.pdf.

* cited by examiner

PLANAR LIGHTWAVE CIRCUIT AND OPTICAL RECEIVER

TECHNICAL FIELD

The present invention relates to a planar lightwave circuit and an optical receiver which receive polarization-multiplexed signal light.

BACKGROUND ART

With the recent explosive growth in network traffic, ultra-high-speed optical transmission systems of 40 Gbit/s and more than 100 Gbit/s have been investigated. With respect to the ultra-high-speed optical transmission systems, active investigation has been performed on digital coherent communication obtained by combining a phase modulation method with coherent detection and digital signal processing technologies. The phase modulation method has better characteristics required for the long haul optical fiber transmission such as characteristics of the tolerance for signal light noise, chromatic dispersion, and polarization mode dispersion.

As a modulation method, Binary Phase Shift Keying (BPSK) and Quadrature Phase Shift Keying (QPSK) have attracted attention because of their excellent tolerances for the dispersion compensation.

Moreover, in order to expand the transmission capacity without the increase in the frequency bandwidth, the research and development have been actively performed toward the practical use on a Dual-Polarization Quadrature Phase Shift Keying (DP-QPSK) method and the like. The Dual-Polarization Quadrature Phase Shift Keying (DP-QPSK) method is a method of multiplexing QPSK signals, which are superior in the frequency utilization efficiency, by two orthogonal polarizations.

An optical receiver for the digital coherent communication will be described below. It will be described here using the QPSK method as an example. With reference to FIG. 5, a process of receiving in the digital coherent communication will be described.

First, an optical receiver 30000 receives signal light in which a TE wave and a TM wave are multiplexed (hereafter, referred to as "TE-wave/TM-wave multiplexed signal light"). A local oscillation light source 32000 outputs local oscillation light in which a TE wave and a TM wave are multiplexed (hereafter, referred to as "TE-wave/TM-wave multiplexed local oscillation light"). The optical reception unit 31000 receives the TE-wave/TM-wave multiplexed signal light and the TE-wave/TM-wave multiplexed local oscillation light, splits each of them depending on the polarization, and makes the separated signal light and local oscillation light interference. The optical receiver 31000 outputs four signal light components in total which are composed of the real components and the imaginary components of each of the two signal light components, each of which has the polarization state parallel to each of two orthogonal polarization axes. The four signal light components are converted into analog electrical signals by an optical detector 33000, and then converted into digital electrical signals by an analog-to-digital converter 34000. These digital electrical signals are transformed by a re-sampling unit (not shown in the figure) into digital electrical signals which are sampled at the symbol rate (also referred to as a baud rate) of the signal light, and then inputted into a digital signal processing unit 35000. The digital signal processing unit 35000 has functions of compensating the chromatic dispersion, the polarization dispersion, and the phase noise and frequency deviation. For example, in compensating the optical carrier frequency deviation and optical phase deviation, the compensation is performed on a frequency deviation between the frequency of the received signal light and the frequency of the local oscillation light, and on an optical phase rotation due to an optical phase deviation, respectively. After that, each of the electrical signals is demodulated by a symbol decision unit 36000 into a bit sequence which an optical transmitter has transmitted.

In this way, the digital coherent detection in the ultra-high-speed optical communication system can be realized.

Hereinafter, the above-mentioned optical reception unit 31000 will be described in more detail. With regard to the optical reception unit, a study on the standardization has been conducted by the OIF (Optical Internetworking Forum), which is an industry organization to promote high-speed data communications, and optical reception units following the standard have been developed. There are various kinds of means for realizing the optical reception unit.

For example, Non Patent Literature 1 describes an example of a polarization demultiplexing unit in an optical reception unit realized by using a micro-optics technology. However, if the micro-optics technology is used in that way, it is difficult to adjust positional relationships between a plurality of bulk elements. Specifically, it is necessary to align the optical axes of the plurality of bulk elements, for example.

It is considered, therefore, that a silica-based planar optical integrated circuit (hereafter, referred to as a "planar lightwave circuit") has promise as a means not requiring adjustments for positional relationships. Patent Literature 1 discloses an example of an optical reception unit realized by using the planar lightwave circuit. Patent Literature 1 discloses a configuration in which a groove is formed at a part of the planar lightwave circuit, and a photonic crystal chip is inserted to intersect a waveguide in order to make the photonic crystal chip function.

CITATION LIST

Non Patent Literature

[NPL 1]
"Fully-Integrated Polarization-Diversity Coherent Receiver Module for 100G DP-QPSK," in Optical Fiber Communication Conference, OSA Technical Digest (CD) (Optical Society of America, 2011), paper OML5

Patent Literature

[PTL 1]
Japanese Patent Application Laid-Open Publication No. 2011-76049

SUMMARY OF INVENTION

Technical Problem

In the configuration of Patent Literature 1, however, waveguides for signal light and waveguides for local oscillation light are intersected at a plurality of points, as disclosed in FIG. 1 of Patent Literature 1. When waveguides are intersected as just described in the planar lightwave circuit, there arises a crosstalk due to leakage light or stray light from one waveguide to the other waveguide at the intersections or in their neighborhood. Because the crosstalk has a significant influence on signal quality in the coherent reception, there has been a problem that signal quality deteriorates due to a plurality of waveguides intersecting with each other at a plurality of points as mentioned above.

The planar lightwave circuit described in Patent Literature 1 has a problem that the polarization extinction ratio of the light inputted into a 90-degree optical hybrid is not sufficient.

In addition, it is necessary in the above-mentioned planar lightwave circuit to equalize the length of respective optical paths for the signal light and the local oscillation light in the path from the point where the light is split depending on the polarization to the point where the light is inputted into the 90-degree optical hybrid in order to prevent a phase difference between signal light beams and between local oscillation light beams after demultiplexing the polarization.

The present invention has been made in view of the above-mentioned problems, and the objective is to provide a planar lightwave circuit and an optical receiver in which, in a planar lightwave circuit including a 90-degree optical hybrid, the points at which waveguides intersect are decreased, the polarization extinction ratio of the light inputted into the 90-degree optical hybrid is improved, and it is easy to equalize the length of respective optical paths for the signal light and the local oscillation light in the path from the point where the light is split depending on the polarization to the point where the light is inputted into the 90-degree optical hybrid.

Solution to Problem

A planar lightwave circuit according to an exemplary aspect of the present invention includes a substrate in which a groove being formed, the groove dividing the substrate into a first area and a second area; a first filter intruded into the groove and performing polarization demultiplexing by transmission and reflection; a second filter included in the first area and performing polarization demultiplexing by transmission and reflection; a third filter included in the second area and performing polarization demultiplexing by transmission and reflection; as are formed in the first area, a first and a second waveguides formed to guide polarization-multiplexed signal light and polarization-multiplexed local oscillation light to the first filter, respectively, a third and a fourth waveguides formed to guide signal light and local oscillation light reflected respectively by the first filter to the second filter, and a first 90-degree optical hybrid formed to make interfere signal light and local oscillation light reflected respectively by the second filter; as are formed in the second area, a fifth and sixth waveguides formed to guide signal light and local oscillation light transmitted through the first filter to the third filter, respectively, and a second 90-degree optical hybrid formed to make interfere signal light and local oscillation light transmitted respectively through the third filter.

An optical receiver according to an exemplary aspect of the present invention includes a planar lightwave circuit demultiplexing each of polarization-multiplexed signal light and polarization-multiplexed local oscillation light depending on polarization, and making the signal light and the local oscillation light interfere with respect to each polarization; a photoelectric conversion unit converting interfering light output from the planar lightwave circuit into an electrical signal; an analog-to-digital conversion unit converting the electrical signal into a digital signal; and a digital signal processing unit processing the digital signal, wherein the planar lightwave circuit includes a substrate in which a groove being formed, the groove dividing the substrate into a first area and a second area; a first filter intruded into the groove and performing polarization demultiplexing by transmission and reflection; a second filter included in the first area and performing polarization demultiplexing by transmission and reflection; a third filter included in the second area and performing polarization demultiplexing by transmission and reflection; as are formed in the first area, a first and a second waveguides formed to guide polarization-multiplexed signal light and polarization-multiplexed local oscillation light to the first filter, respectively, a third and a fourth waveguides formed to guide signal light and local oscillation light reflected respectively by the first filter to the second filter, and a first 90-degree optical hybrid formed to make interfere signal light and local oscillation light reflected respectively by the second filter; as are formed in the second area, a fifth and sixth waveguides formed to guide signal light and local oscillation light transmitted through the first filter to the third filter, respectively, and a second 90-degree optical hybrid formed to make interfere signal light and local oscillation light transmitted respectively through the third filter.

Advantageous Effects of Invention

According to the present invention, it becomes possible to provide a planar lightwave circuit and an optical receiver in which, in a planar lightwave circuit including a 90-degree optical hybrid, the points at which waveguides intersect are decreased, the polarization extinction ratio of the light inputted into the 90-degree optical hybrid is improved, and it is easy to equalize the length of respective optical paths for the signal light and the local oscillation light in the path from the point where the light is split depending on the polarization to the point where the light is inputted into the 90-degree optical hybrid.

DESCRIPTION OF EMBODIMENTS

The exemplary embodiment of the present invention will be described with reference to drawings below.

Figure 1:
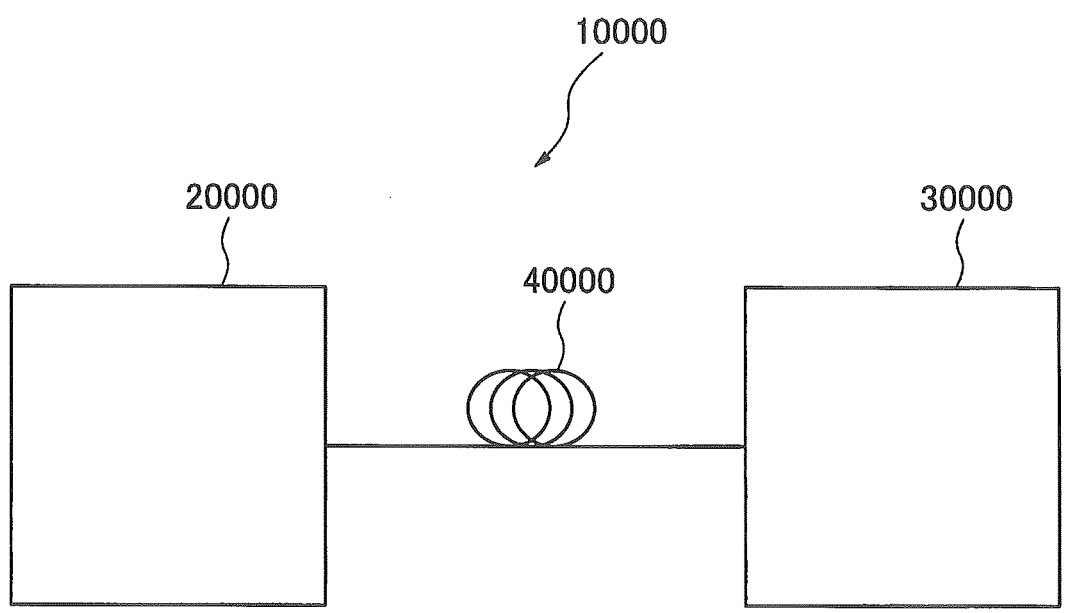
FIG. 1 is a functional block diagram of an optical transmission system 10000 in accordance with the exemplary embodiment of the present invention.

First, an optical transmission system 10000 will be described using FIG. 1. The optical transmission system 10000 includes an optical transmitter 20000 transmitting signal light modulated by polarization-multiplexed M-level phase modulation (M representing an integer equal to or larger than two), a transmission line 40000 propagating the signal light transmitted by the optical transmitter 20000, and an optical receiver 30000 receiving the signal light through the transmission line 40000.

A single mode optical fiber can be used as the transmission line 40000, for example.

Figure 5:
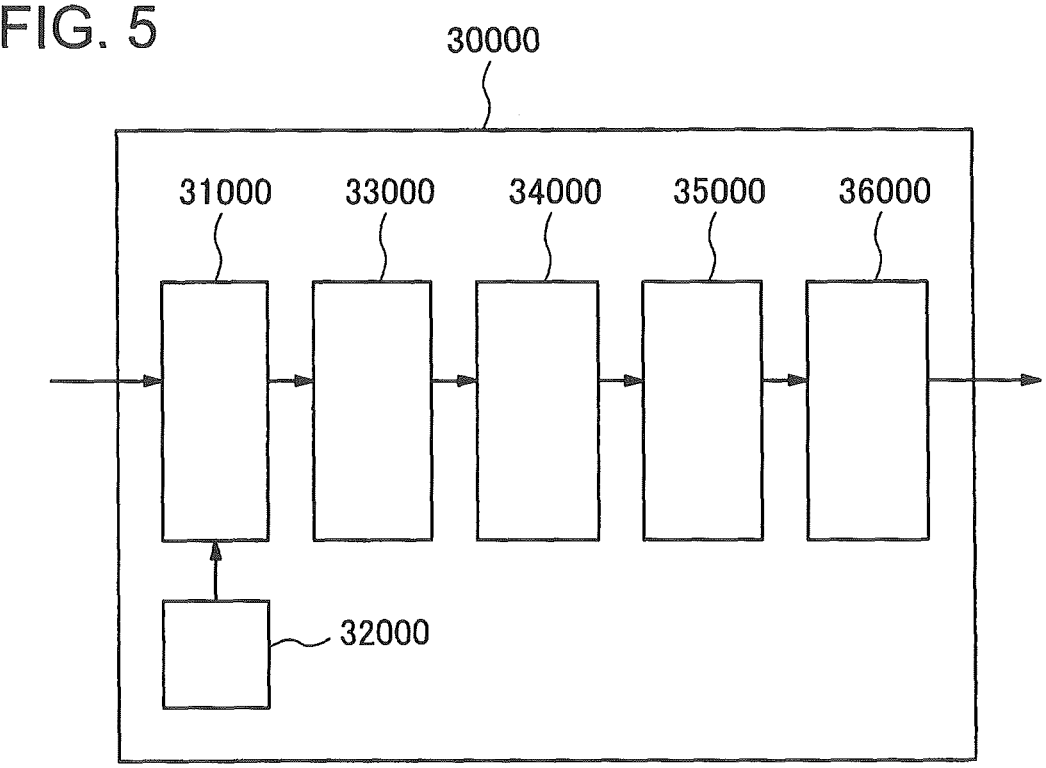
FIG. 5 is a functional block diagram of an optical receiver 30000 in accordance with the exemplary embodiment of the present invention.

The optical receiver 30000 demodulates the signal light and outputs demodulated bit sequence to the outside. An example of a configuration of the optical receiver 30000 will be described using FIG. 5. The demodulation using the digital signal processing will be described as an example.

The optical receiver 30000 includes an optical reception unit 31000, a local oscillation light source 32000, a photoelectric conversion unit 33000, an analog-to-digital converter 34000, a digital signal processing unit 35000, and a demodulation unit 36000.

The optical reception unit 31000 demultiplexes inputted polarization-multiplexed signal light and inputted polarization-multiplexed local oscillation light respectively depending on the polarization (hereafter, referred to as "polarization demultiplexing"), and makes the signal light and the local oscillation light interfere with respect to each polarization. And then the interfering light made to interfere is output to the photoelectric conversion unit 33000.

The linear polarizations of TE and TM are available for the polarization to be multiplexed together. The polarization multiplexing makes it possible to double substantially a bit rate at which to be transmitted by one wavelength.

The local oscillation light source 32000 outputs the light with the frequency comparable to that of the signal light transmitted by the optical transmitter 20000 as the local oscillation light. If the signal light transmitted by the optical transmitter 20000 is wavelength-multiplexed, the local oscillation light source 32000 outputs the light with the frequency comparable to that of one of a plurality of wavelengths as the local oscillation light.

The photoelectric conversion unit 33000 converts the interfering light into electrical signals and outputs the converted electrical signals to the analog-to-digital converter 34000.

The analog-to-digital converter 34000 converts the electrical signals after conversion of analog signals into digital signals. And then the digital signals are output to the digital signal processing unit 35000.

The digital signal processing unit 35000 extracts the information about the phase and intensity of the signal light from the digital signals. The digital signal processing unit 35000 has functions of compensating the chromatic dispersion, the polarization dispersion, and the phase noise and frequency deviation, for example.

The demodulation unit 36000 demodulates a bit sequence transmitted by the transmitter 20000 on the basis of the information about the phase and intensity of the signal light extracted by the digital signal processing unit 35000.

Next, using FIG. 2, the optical reception unit 31000 will be described in more detail which is realized using a planar lightwave circuit.

The reception unit 31000 is composed of various components formed on a silica-based substrate 31100.

In the substrate 31100, a groove 31110 is formed which divides the surface area into an area 31120 and an area 31130. The groove may be of any width and depth as long as a thin film filter can be intruded into and fixed in the groove. The groove 31110 described above can be easily formed by a dicing process, for example. In this case, the shape of the groove in a longitudinal direction is a linear shape.

There are, formed on the substrate 31100, a signal light input unit 31131, a local oscillation light input unit 31132, waveguides 31133, 31134, 31135, 31136, 31121, and 31122, 90-degree optical hybrids 31123, 31137, and output units 31138, 31139, 31124, and 31125.

The optical reception unit 31000 further includes a filter 31111 which is intruded into the groove 31110 and performs the polarization demultiplexing by transmission and reflection. The performing the polarization demultiplexing by transmission and reflection means demultiplexing the polarization by transmitting a TE wave and reflecting a TM wave, for example. The filter having such properties has already been put into practical use as a thin film filter, for example. If the thin film filter is used, it is called a TE-transmissive/TM-reflective type thin film filter. The present exemplary embodiment will be described in which the filter 31111 is such a TE-transmissive/TM-reflective type thin film filter, as an example.

The signal light input unit 31131 receives the polarization-multiplexed signal light transmitted from the optical transmitter 20000 through the transmission line 40000.

The local oscillation light input unit 31132 receives the polarization-multiplexed local oscillation light. It is assumed that the local oscillation light source 32000 outputs local oscillation light with single polarization, for example. In this case, the local oscillation light is inputted into the local oscillation light input unit 31132 so that the polarization plane of the local oscillation light may have a predetermined angle to the polarization plane defined by the filter 31111. This makes the polarization-multiplexed local oscillation light inputted from the local oscillation light input unit 31132 with reference to the polarization plane defined by the filter 31111.

The characteristics of the filter 31111 will be described below. The filter 31111 exhibits various transmittances by polarization of the incident light. In more detail, the filter 31111 has various transmittances by polarization depending on its material or configuration, the incident angle of the incident light, or the wavelength of the incident light. The filter 31111 achieves the polarization demultiplexing function using the variation of reflection and transmission characteristics depending on the polarization.

Figure 4:
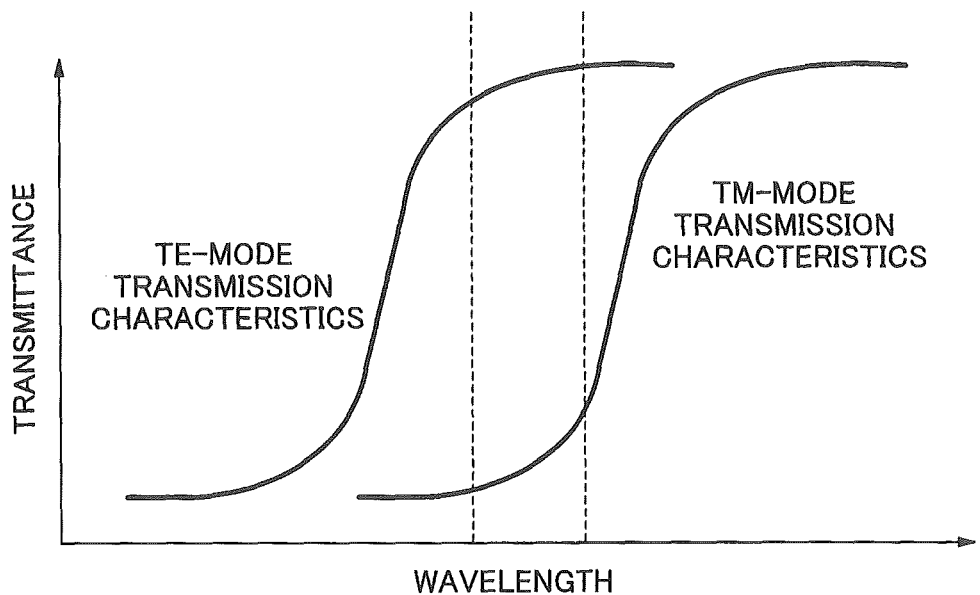
FIG. 4 is an example of a transmission spectrum with a dielectric multi-layer filter used.

FIG. 4 shows an example of a transmission spectrum of the filter 31111 described above. This example is a transmission spectrum where a dielectric multi-layer filter, which will be described below, is used as the filter 31111. Here, the transmission spectrum is defined as a relationship between the wavelength and the transmittance of the light entering the filter 31111. The horizontal axis in FIG. 4 represents the wavelength of the light entering the filter 31111, and the vertical axis represents the transmittance. One line on the graph shows the transmission spectrum of the filter 31111 for the TE wave, and the other line on the graph shows that for the TM wave. The TM wave is defined as an electromagnetic wave whose electric field component oscillates in a direction perpendicular to the surface of the substrate 31100, and the TE wave is defined as an electromagnetic wave whose electric field component lies in the surface of the substrate 31100 and oscillates in a direction perpendicular to the travelling direction of the electromagnetic wave. For example, if the light with a wavelength in the range between the dotted lines shown in FIG. 4 is entered into the filter 31111, the transmitted light mainly includes the TE wave, and the reflected light mainly includes the TM wave.

As can be seen from the graph in FIG. 4, each of the transmitted light and the reflected light mainly has either polarization. That is to say, it does not necessarily follow that each of the transmitted light and the reflected light has either polarization only, but it can include both polarizations. The TE-light transmitted through the filter 31111, therefore, also includes the TM wave in some small measure. Much the same is true on the TM-light reflected by the filter 31111.

As a material of the filter 31111 described above, there is a dielectric multi-layer filter, for example. The dielectric multi-layer filter can be produced by laminating a plurality of films having various transmittance values and thicknesses.

Next, the shape of the filter will be described. The filter 31111 has a finite thickness in the light incident direction. It is only necessary for the light incidence plane of the filter 31111 to have an area almost equal to or larger than the area of light irradiation.

The after-mentioned filters 31141 and 31151 also have characteristics, materials, and shapes similar to those of the filter 31111.

The waveguide 31133 is formed to guide the signal light, which is polarization-multiplexed and inputted from the signal light input unit 31131, to the filter 31111. The waveguide 31133 is formed so that the optical axis may be angled at a non-right angle to the reflection surface of the filter 31111. This can prevent the reflected light from moving backward toward the waveguide 31133. The reflection surface is a surface facing a side surface of the groove 31110 in the filter 31111 region.

Next, a structure of the waveguide 31133 and a method for forming the waveguide 31133 on the substrate 31100 will be described. As to the structure of the waveguide 31133, the refractive index of the core layer is set to be about 1.5% larger than that of the cladding layer surrounding the core layer. By the difference in refractive index, the waveguide 31133 confines the light in the planar direction of the substrate 31100. The waveguide 31133 is formed on the substrate 31100 made of silicon (Si) by CVD (Chemical Vapor Deposition) or the like. The waveguide structure and the method for forming the waveguide on the substrate described above are similar to other waveguides described below.

The waveguide 31134 is formed to guide the local oscillation light, which is inputted from the local oscillation light input unit 31132 and polarization-multiplexed, to the filter 31111. The waveguide 31134 is also formed so that the optical axis may be angled at a non-right angle to the reflection surface of the filter 31111. The waveguide 31121 is formed to guide the transmitted light, which is output from the filter 31111 and included in the polarization-multiplexed signal light, to the 90-degree optical hybrid 31123. The waveguide 31135 is formed to guide the reflected light, which is reflected by the filter 31111 and included in the polarization-multiplexed signal light, to the 90-degree optical hybrid 31137. The waveguide 31122 is formed to guide the transmitted light, which is output from the filter 31111 and included in the polarization-multiplexed local oscillation light, to the 90-degree optical hybrid 31123. The waveguide 31136 is formed to guide the reflected light, which is reflected by the filter 31111 and included in the polarization-multiplexed local oscillation light, to the 90-degree optical hybrid 31137.

Figure 2:
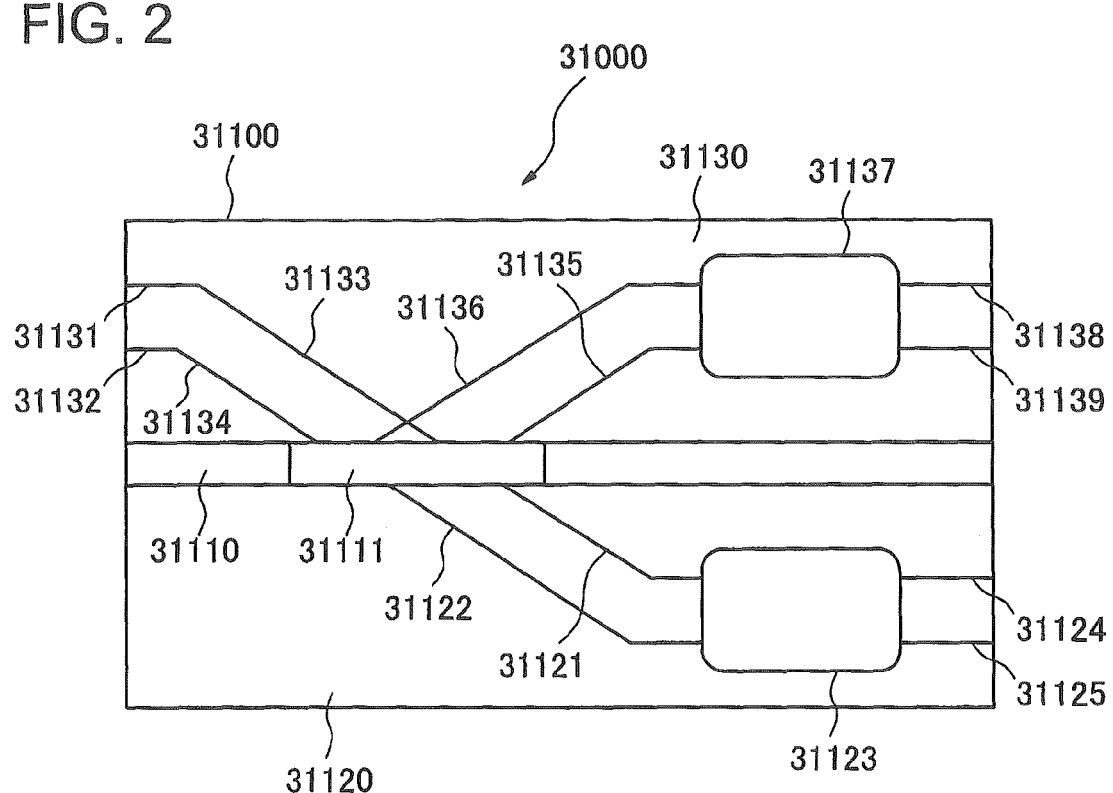
FIG. 2 is a functional block diagram of an optical reception unit 31000 in accordance with the exemplary embodiment of the present invention.

As shown in FIG. 2, the waveguides 31133, 31134, 31135, and 31136 are formed in the area 31130 on the substrate 31100. The waveguides 31121 and 31122 are formed in the area 31120 on the substrate 31100.

The 90-degree optical hybrid 31123 is formed in the area 31120 to make the signal light and the local oscillation light interfere which are transmitted through the filter 31111. The 90-degree optical hybrid 31137 is formed in the area 31120 to make the signal light and the local oscillation light interfere which are reflected by the filter 31111.

The 90-degree optical hybrid 31123 extracts real components and imaginary components of the guided signal light by making the signal light and the local oscillation light interfere which are guided by the waveguide 31121 and the waveguide 31122. The 90-degree optical hybrid 31137 extracts real components and imaginary components of the guided signal light by making the signal light and the local oscillation light interfere which are guided by the waveguide 31135 and the waveguide 31136.

The output unit 31124 outputs to the outside the real components of the signal light which have been extracted by the 90-degree optical hybrid 31123. The output unit 31125 outputs to the outside the imaginary components of the signal light which have been extracted by the 90-degree optical hybrid 31123. The output unit 31138 outputs to the outside the real components of the signal light which have been extracted by the 90-degree optical hybrid 31137. The output unit 31139 outputs to the outside the imaginary components of the signal light which have been extracted by the 90-degree optical hybrid 31137.

An example of the configuration of the planar lightwave circuit 31000 has been described above.

Next, the operation of the planar lightwave circuit 31000 shown in FIG. 2 will be described.

First, the polarization-multiplexed signal light transmitted through the transmission line 40000 is inputted into the signal light input unit 31131. On the other hand, the polarization-multiplexed local oscillation light from the local oscillation light source 32000 is inputted into the local oscillation light input unit 31132.

The waveguide 31133 guides the polarization-multiplexed signal light to the filter 31111. On the other hand, the waveguide 31134 guides the polarization-multiplexed local oscillation light to the filter 31111.

The waveguide 31121 guides the transmitted light of the signal light through the filter 31111 to the 90-degree optical hybrid 31123. On the other hand, the waveguide 31122 guides the transmitted light of the local oscillation light through the filter 31111 to the 90-degree optical hybrid 31123.

The waveguide 31135 guides the reflected light of the signal light from the filter 31111 to the 90-degree optical hybrid 31137. On the other hand, the waveguide 31136 guides the reflected light of the local oscillation light from the filter 31111 to the 90-degree optical hybrid 31137.

The 90-degree optical hybrid 31123 makes the light interfere which is composed of the signal light guided by the waveguide 31121 and the local oscillation light guided by the waveguide 31122. On the other hand, the 90-degree optical hybrid 31137 makes the light interfere which is composed of the signal light guided by the waveguide 31135 and the local oscillation light guided by the waveguide 31136.

And then, the output unit 31124 and the output unit 31125 output the interfering light having interfered in the 90-degree optical hybrid 31123 to the photoelectric conversion unit 33000. The output unit 31138 and the output unit 31139 output the interfering light having interfered in the 90-degree optical hybrid 31137 to the photoelectric conversion unit 33000.

The operation of the planar lightwave circuit 31000 shown in FIG. 2 has been described above.

As described above, in the present exemplary embodiment, the 90-degree optical hybrid 31123 is formed in the area 31120 on the substrate 31100, and the 90-degree optical hybrid 31137 is formed in the area 31130 on the substrate 31100. In addition, by intruding into the groove 31110 the filter 31111 which splits the polarization-multiplexed signal light depending on the polarization, the waveguides connected to the 90-degree optical hybrid 31123 are separated from the waveguides connected to the 90-degree optical hybrid 31137 by the groove 31110. This makes it possible to decrease the points at which waveguides 31121, 31135, 31122, and 31136 intersect and guide the polarization-demultiplexed signal light and local oscillation light to the 90-degree optical hybrids 31123 and 31137.

It becomes possible to form the waveguides 31121 and 31135, the waveguides 31122 and 31136, and the 90-degree optical hybrids 31123 and 31137 symmetrically with respect to the groove 31110. This makes it possible to easily equalize the length of the waveguides 31121 and 31135, and the length of the waveguides 31122 and 31136. As a result, it becomes possible to easily equalize the length of respective optical paths for the signal light and the local oscillation light in the path from the point where the light is split depending on the polarization to the point where the light is inputted into the 90-degree optical hybrid.

Preferably, the waveguides 31121 and 31135 are formed with their lengths equal to each other. This equalizes the optical path length through which the signal light interfering with the local oscillation light in the 90-degree optical hybrid 31123 is transmitted, to the optical path length through which the signal light interfering with the local oscillation light in the 90-degree optical hybrid 31137 is transmitted. As a result, it is possible to reduce a skew occurring between the two signal light beams and reduce the deterioration of the signal quality.

More preferably, the waveguides 31122 and 31135 are formed with their lengths equal to each other.

Figure 3:
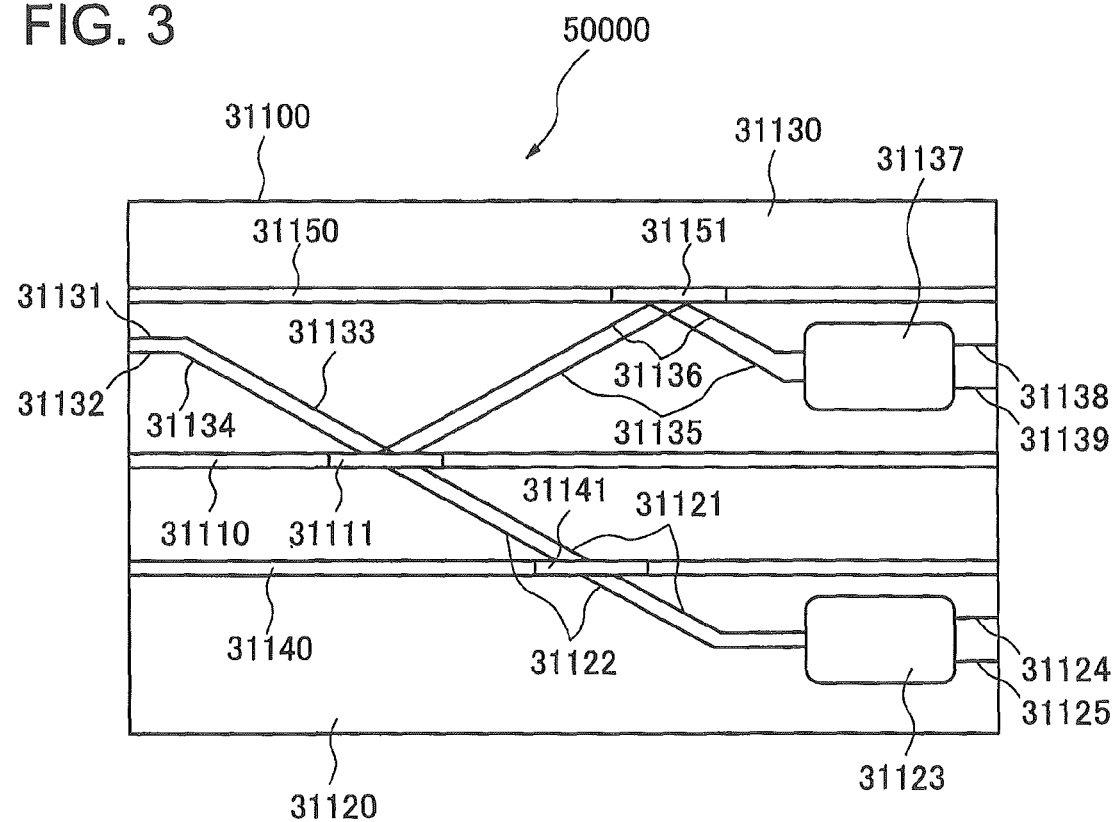
FIG. 3 is an example of a configuration of an optical reception unit 50000 in accordance with the exemplary embodiment of the present invention.

Next, a modified example will be described using FIG. 3 in which an optical reception unit 50000 is realized by a planar lightwave circuit. The identical reference signs are attached to the same configurations as those of the planar lightwave circuit 31000 shown in FIG. 2, and their descriptions will be omitted for simplification.

In the planar lightwave circuit 50000, a groove 31140 is additionally formed in the area 31120, and a groove 31150 is additionally formed in the area 31130. The planar lightwave circuit 50000 includes a filter 31141 and a filter 31151.

The filter 31141 is included in the area 31120 and performs the polarization demultiplexing by transmission and reflection. On the other hand, the filter 31151 is included in the area 31130 and performs the polarization demultiplexing by transmission and reflection. Here, the filter 31141 is included in the area 31120 by being intruded into the groove 31140, and the filter 31151 is included in the area 31130 by being intruded into the groove 31150. The present exemplary embodiment will be described using TE-transmissive/TM-reflective type thin film filters as the filters 31141 and 31151.

In the present exemplary embodiment, the waveguide 31121 is formed to guide to the filter 31141 the transmitted light which is output from the filter 31111 and included in the polarization-multiplexed signal light, and guide the transmitted light output from the filter 31141 to the 90-degree optical hybrid 31123. The waveguide 31122 is formed to guide to the filter 31141 the transmitted light which is output from the filter 31111 and included in the polarization-multiplexed local oscillation light, and guide the transmitted light output from the filter 31141 to the 90-degree optical hybrid 31123. Here, the waveguides 31121 and 31122 are formed so that the guided light may be entered with its optical axis angled at a non-right angle to the reflection surface of the filter 31141.

The waveguide 31135 is formed to guide the reflected light, which is reflected by the filter 31111 and included in the polarization-multiplexed signal light, to the filter 31151, and guide the reflected light reflected by the filter 31151 to the 90-degree optical hybrid 31137. The waveguide 31136 is formed to guide the reflected light, which is reflected by the filter 31111 and included in the polarization-multiplexed signal light, to the filter 31151, and guide the reflected light reflected by the filter 31151 to the 90-degree optical hybrid 31137. Here, the waveguides 31135 and 31136 are also formed so that the guided light may be entered with its optical axis angled at a non-right angle to the reflection surface of the filter 31151.

An example of the configuration of the planar lightwave circuit 50000 has been described above.

Next, the operation of the planar lightwave circuit 50000 shown in FIG. 3 will be described.

First, the signal light transmitted through the transmission line 40000 is inputted into the signal light input unit 31131. The polarization-multiplexed local oscillation light from the local oscillation light source 32000 is inputted into the local oscillation light input unit 31132.

The waveguide 31133 guides the polarization-multiplexed signal light to the filter 31111. On the other hand, the waveguide 31134 guides the polarization-multiplexed local oscillation light to the filter 31111.

Next, the waveguide 31121 guides the transmitted light, which is output from the filter 31111 and included in the polarization-multiplexed signal light, to the filter 31141. And it guides the transmitted light output from the filter 31141 to the 90-degree optical hybrid 31123. On the other hand, the waveguide 31122 guides the transmitted light, which is output from the filter 31111 and included in the TE-wave/TM-wave multiplexed local oscillation light, to the filter 31141. And it guides the transmitted light output from the filter 31141 to the 90-degree optical hybrid 31123.

The waveguide 31135 guides the reflected light, which is reflected by the filter 31111 and included in the polarization-multiplexed signal light, to the filter 31151. And it guides the reflected light reflected by the filter 31151 to the 90-degree optical hybrid 31137. On the other hand, the waveguide 31136 guides the reflected light, which is reflected by the filter 31111 and included in the polarization-multiplexed local oscillation light, to the filter 31151. And it guides the reflected light reflected by the filter 31151 to the 90-degree optical hybrid 31137.

The subsequent operations are the same as those of the planar lightwave circuit 31000, and accordingly their descriptions are omitted.

As mentioned above, the modified example, compared with the planar lightwave circuit 31000, further includes the filter 31141 which is included in the area 31120 and performs the polarization demultiplexing by transmission and reflection, and the filter 31151 which is included in the area 31130 and performs the polarization demultiplexing by transmission and reflection.

It is possible to further transmit, through the filter 31141, the signal light and local oscillation light transmitted through the filter 31111 by including multiple-stage filters in the path through which the signal light and the local oscillation light are guided as mentioned above. This makes it possible to further improve the polarization extinction ratio of the light inputted into the 90-degree optical hybrid 31123. It is also possible to make the filter 31151 further reflect the signal light and the local oscillation light having been reflected by the filter 31111. This makes it possible to further improve the polarization extinction ratio of the light inputted into the 90-degree optical hybrid 31137.

The planar lightwave circuit 50000 in accordance with the modified example has the characteristics of the planar lightwave circuit 31000 in accordance with the above-mentioned exemplary embodiment as well. It is possible, therefore, in the planar lightwave circuit including the 90-degree optical hybrid, to decrease the points at which waveguides intersect and to improve the polarization extinction ratio of the light inputted into the 90-degree optical hybrid. In addition, it becomes possible to easily equalize the length of respective optical paths for the signal light and the local oscillation light in the path from the point where the light is split depending on the polarization to the point where the light is inputted into the 90-degree optical hybrid.

Although the present invention has been described above using the exemplary embodiments as an example, the present invention is not limited to the above-described exemplary embodiments and can be variously modified and implemented within the technological scope of the present invention.

For example, although the above-described exemplary embodiment has been described using M-level phase shift keying, it is also acceptable to use Amplitude Phase Shift Keying (APSK) and M-level Quadrature Amplitude Modulation (QAM) which is one of APSK methods. It is also acceptable to employ Orthogonal Frequency Division Multiplexing (OFDM) as transmission methods, and to employ the polarization-multiplexed M-level phase shift keying or the like for at least one of the subcarriers.

With regard to the configuration of the transmission line 40000, it is also acceptable to use a multimode optical fiber in place of a single mode optical fiber.

Although the example has been shown in the above-described exemplary embodiment in which the local oscillation light source 32000 is included in the optical receiver 30000, it is also acceptable to have the local oscillation light source 32000 outside the optical receiver 30000. In that case, the optical receiver 30000 further includes an input unit into which the local oscillation light from the local oscillation light source 32000 is inputted.

The shape of the grooves 31110, 31140 and 31150 is not necessarily a linear shape in the longitudinal direction of the substrate 31100, but it is also acceptable to be a curved shape in the longitudinal direction. These grooves can be formed traversing the substrate completely from end to end. It is not excluded, however, to form the grooves stopped in the middle of the substrate. If the grooves are formed stopped in the middle of the substrate, it can be assumed to separate the area 31120 and the area 31130 by a hypothetical extended line. The grooves can be formed by methods other than a dicing process.

Although the example has been described in which the dielectric multi-layer filter is used as the material for the filters 31111, 31141, and 31151, a photonic crystal polarizer can be also used.

The above-described exemplary embodiment has been described using the filters having the properties of transmitting a TE wave and reflecting a TM wave as the filters 31131, 31141, and 31151. It is also acceptable, however, to use a filter having the properties of transmitting a TM wave and reflecting a TE wave as the filters 31131, 31141, and 31151. Such a filter can be called a TE-reflective/TM-transmissive type thin film filter, and is realized by changing the material and configuration depending on the wavelength and the incident angle of the incident light.

Although the above-described exemplary embodiment has been described in which the filter 33151 is intruded into the groove 31150, the filter 33151 can be attached on the side of the substrate 31100 in the area 31130. In that case, there is no need to form the groove 31150 in the area 31130.

This application is based upon and claims the benefit of priority from Japanese Patent Application No. 2012-048681, filed on Mar. 6, 2012, the disclosure of which is incorporated herein in its entirety by reference.

[Reference Signs List]
10000 optical transmission system
20000 optical transmitter
40000 transmission line
30000 optical receiver
31000, 50000 optical reception unit
32000 local oscillation light source
33000 photoelectric conversion unit
34000 analog-to-digital converter
35000 digital signal processing unit
36000 demodulation unit
31100 substrate
31110, 31140, 31150 groove
31120, 31130 area
31131 signal light input unit
31132 local oscillation light input unit
31133, 31134, 31135, 31136, 31121, 31122 waveguide
31111, 31141, 31151 filter
31137, 31123 90-degree optical hybrid
31124, 31125, 31138, 31139 output unit

The invention claimed is:

1. A planar lightwave circuit, comprising:
a substrate in which a groove being formed, the groove dividing the substrate into a first area and a second area;
a first filter intruded into the groove and performing polarization demultiplexing by transmission and reflection;
a second filter comprised in the first area and performing polarization demultiplexing by transmission and reflection;
a third filter comprised in the second area and performing polarization demultiplexing by transmission and reflection;
as are formed in the first area,
   a first and a second waveguides formed to guide polarization-multiplexed signal light and polarization-multiplexed local oscillation light to the first filter, respectively,
   a third and a fourth waveguides formed to guide signal light and local oscillation light reflected respectively by the first filter to the second filter, and
   a first 90-degree optical hybrid formed to make interfere signal light and local oscillation light reflected respectively by the second filter;
as are formed in the second area,
   a fifth and sixth waveguides formed to guide signal light and local oscillation light transmitted through the first filter to the third filter, respectively, and
   a second 90-degree optical hybrid formed to make interfere signal light and local oscillation light transmitted respectively through the third filter.

2. The planar lightwave circuit according to claim 1, wherein each of the first to third filters is one of a TE-transmissive/TM-reflective type thin film filter and a TE-reflective/TM-transmissive type thin film filter.

3. The planar lightwave circuit according to claim 2, wherein the length of the third waveguide is equal to the length of the fifth waveguide.

4. The planar lightwave circuit according to claim 2, wherein the length of the fourth waveguide is equal to the length of the sixth waveguide.

5. The planar lightwave circuit according to claim 2, wherein the second filter is intruded into a groove formed in the first area.

6. The planar lightwave circuit according to claim 2, wherein the second filter is attached on a side of the substrate in the first area.

7. The planar lightwave circuit according to claim 2, wherein the third filter is intruded into a groove formed in the second area.

8. The planar lightwave circuit according to claim 1, wherein the length of the third waveguide is equal to the length of the fifth waveguide.

9. The planar lightwave circuit according to claim 8, wherein the second filter is intruded into a groove formed in the first area.

10. The planar lightwave circuit according to claim 8, wherein the second filter is attached on a side of the substrate in the first area.

11. The planar lightwave circuit according to claim 8, wherein the third filter is intruded into a groove formed in the second area.

12. The planar lightwave circuit according to claim 1, wherein the length of the fourth waveguide is equal to the length of the sixth waveguide.

13. The planar lightwave circuit according to claim 12, wherein the length of the fourth waveguide is equal to the length of the sixth waveguide.

14. The planar lightwave circuit according to claim 12, wherein the second filter is intruded into a groove formed in the first area.

15. The planar lightwave circuit according to claim 12, wherein the second filter is attached on a side of the substrate in the first area.

16. The planar lightwave circuit according to claim 1, wherein the second filter is intruded into a groove formed in the first area.

17. The planar lightwave circuit according to claim 1, wherein the second filter is attached on a side of the substrate in the first area.

18. The planar lightwave circuit according to claim 1, wherein the third filter is intruded into a groove formed in the second area.

19. The planar lightwave circuit according to claim 1, wherein the first and second 90-degree optical hybrids output a real component and an imaginary component of entered signal light, respectively.

20. An optical receiver, comprising:
a planar lightwave circuit demultiplexing each of polarization-multiplexed signal light and polarization-multiplexed local oscillation light depending on polarization, and making the signal light and the local oscillation light interfere with respect to each polarization;
a photoelectric conversion unit converting interfering light output from the planar lightwave circuit into an electrical signal;
an analog-to-digital conversion unit converting the electrical signal into a digital signal; and
a digital signal processing unit processing the digital signal,
wherein the planar lightwave circuit comprises
a substrate in which a groove being formed, the groove dividing the substrate into a first area and a second area;
a first filter intruded into the groove and performing polarization demultiplexing by transmission and reflection;
a second filter comprised in the first area and performing polarization demultiplexing by transmission and reflection;
a third filter comprised in the second area and performing polarization demultiplexing by transmission and reflection;
as are formed in the first area,
a first and a second waveguides formed to guide polarization-multiplexed signal light and polarization-multiplexed local oscillation light to the first filter, respectively,
a third and a fourth waveguides formed to guide signal light and local oscillation light reflected respectively by the first filter to the second filter, and
a first 90-degree optical hybrid formed to make interfere signal light and local oscillation light reflected respectively by the second filter;
as are formed in the second area,
a fifth and sixth waveguides formed to guide signal light and local oscillation light transmitted through the first filter to the third filter, respectively, and
a second 90-degree optical hybrid formed to make interfere signal light and local oscillation light transmitted respectively through the third filter.

* * * * *